United States Patent
Chen (10) Patent No.: US 11,381,943 B2
(45) Date of Patent: Jul. 5, 2022

(54) SYSTEM AND METHOD FOR PERFORMING VEHICLE TO PEDESTRIAN COMMUNICATION

(71) Applicant: Huawei Cloud Computing Technologies Co., Ltd., Guizhou (CN)

(72) Inventor: Xiaoguang Chen, Xi'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 17/029,532

(22) Filed: Sep. 23, 2020

(65) Prior Publication Data
US 2021/0006956 A1    Jan. 7, 2021

Related U.S. Application Data

(63) Continuation of application No. PCT/CN2019/078372, filed on Mar. 15, 2019.

(30) Foreign Application Priority Data

Mar. 23, 2018    (CN) .......................... 201810251672.8

(51) Int. Cl.
*H04W 4/40*    (2018.01)
*H04W 76/22*    (2018.01)
(Continued)

(52) U.S. Cl.
CPC .............. *H04W 4/40* (2018.02); *H04W 4/029* (2018.02); *H04W 76/11* (2018.02); *H04W 76/22* (2018.02)

(58) Field of Classification Search
CPC ....... H04W 4/40; H04W 76/22; H04W 76/11; H04W 4/029; H04W 4/44; H04W 52/0235; H04W 52/028; H04W 52/0229; H04W 52/02; H04W 4/02; H04W 4/46; H04W 4/48; H04W 4/50; H04W 4/80; (Continued)

(56) References Cited

U.S. PATENT DOCUMENTS 9,421,909 B2 *  8/2016 Strickland et al. .... B60Q 9/008
9,786,178 B1 * 10/2017 Bai et al. ............... G08G 1/166
(Continued)

FOREIGN PATENT DOCUMENTS

CN        103970877 A       8/2014
CN        104933893 A       9/2015
(Continued)

OTHER PUBLICATIONS

Nokia et al: "Efficient V2P/P2V activation," 3GPP DRAFT; R2-168426, Nov. 4, 2016, XP051192501, 4 pages.
(Continued)

*Primary Examiner* — Meless N Zewdu
(74) *Attorney, Agent, or Firm* — Conley Rose, P.C.

(57) ABSTRACT

A method includes obtaining, by a control platform, request information, where the request information carries an identifier of user equipment (UE) and an identifier of a vehicle-mounted device, and sending indication information to the UE based on the request information, where the indication information instructs the UE to disable or enable a vehicle-to-pedestrian (V2P) function to forbid or allow the UE to transmit a V2P message.

20 Claims, 6 Drawing Sheets

(51) Int. Cl.
*H04W 4/029* (2018.01)
*H04W 76/11* (2018.01)

(58) Field of Classification Search
CPC ........... H04W 4/90; H04W 4/30; H04W 4/38;
H04W 88/00; H04W 88/02; H04W 88/08;
H04W 88/18; H04W 8/00; H04W 8/005;
H04W 8/08; H04W 4/021; H04L 67/12;
H04L 67/125; H04L 20/08; H04L
29/08306; H04L 29/06537; Y02D 30/70;
G08G 1/00; G08G 1/166; G08G 1/16;
G08G 1/163; G08G 1/005
See application file for complete search history.

(56) References Cited

U.S. PATENT DOCUMENTS

| | | | |
|---|---|---|---|
| 2015/0035685 A1* | 2/2015 | Strickland et al. | B60Q 9/008 |
| 2015/0091740 A1* | 4/2015 | Bai et al. | H04W 40/08 |
| 2017/0150490 A1 | 5/2017 | Chen et al. | |
| 2018/0042039 A1* | 2/2018 | Senba et al. | H04W 72/1242 |
| 2018/0061230 A1* | 3/2018 | Madigan et al. | G08G 1/095 |
| 2018/0096605 A1* | 4/2018 | Bai et al. | G08G 1/166 |
| 2018/0262865 A1* | 9/2018 | Lepp et al. | H04W 4/008 |
| 2018/0302768 A1* | 10/2018 | Uchiyama | H04W 4/40 |
| 2018/0324560 A1* | 11/2018 | Xu et al. | H04W 4/06 |
| 2019/0007846 A1* | 1/2019 | Lee et al. | H04W 24/02 |

FOREIGN PATENT DOCUMENTS

| | | |
|---|---|---|
| CN | 106488387 A | 3/2017 |
| CN | 106507449 A | 3/2017 |
| CN | 106792891 A | 5/2017 |
| EP | 3349514 A1 | 7/2018 |
| WO | 2017041521 A1 | 3/2017 |
| WO | 2017134986 A1 | 8/2017 |

OTHER PUBLICATIONS

ZTE: "Discussion on V2P aspects," 3GPP DRAFT; R2-166609, Oct. 9, 2016, XP051151106, 4 pages.

R2-166594 Coolpad, "Discussion on power saving for P-UE," 3GPP TSG-RAN WG2 Meeting #95bis, Kaohsiung, Oct. 10-14, 2016, 3 pages.

3GPP TR 22 885 V14 0.0, "3rd Generation Partnership Project; Technical Specification Group Services and System Aspects; Study on LTE support for Vehicle to Everything (V2X) services (Release 14)," Dec. 2015, 50 pages.

3GPP TS 23.285 V14.5.0 "3rd Generation Partnership Project; Technical Specification Group Services and System Aspects; Architecture enhancements for V2X services (Release 14)," Dec. 2017, 36 pages.

3GPP TR 23.786 V0.4.0, "3rd Generation Partnership Project; Technical Specification Group Services and System Aspects; Study on architecture enhancements for EPS and 5G System to support advanced V2Xservices (Release 16)," Mar. 13, 2018, 23 pages.

* cited by examiner

SYSTEM AND METHOD FOR PERFORMING VEHICLE TO PEDESTRIAN COMMUNICATION

CROSS-REFERENCE TO RELATED APPLICATIONS

This application is a continuation application of International Patent Application No. PCT/CN2019/078372 filed on Mar. 15, 2019, which claims priority to Chinese Patent Application No. 201810251672.8 filed on Mar. 23, 2018. The disclosures of the aforementioned applications are hereby incorporated by reference in their entireties.

TECHNICAL FIELD

The present disclosure relates to the field of Internet of vehicles technologies, and in particular, to an information processing method, a related device, and a computer storage medium.

BACKGROUND

Internet of things (IoT) is a network formed by implementing interconnection and interworking between ubiquitous terminals over a wireless communications network and/or a wired communications network. As the IoT rapidly develops, the IoT plays a more important role in the safe driving and intelligent transportation system (ITS) fields. In the safe driving field, the IoT is also referred to as Internet of vehicles, and is mainly embodied in vehicle-to-roadside unit (RSU) communication, vehicle-to-vehicle (V2V) communication, vehicle-to-pedestrian (V2P) communication, vehicle-to-network communication, and the like. Safe driving is implemented by exchanging broadcast messages of vehicles. In the V2P communication, a vehicle may broadcast information such as a speed, a location, and a driving direction of the vehicle to a neighboring pedestrian device (that is, user equipment). In addition, the vehicle may receive a broadcast message from the pedestrian device, to raise an alarm when a pedestrian approaches the vehicle, and effectively protect the vehicle and the pedestrian from a safety accident.

However, it is found in practice that when a person is in a vehicle, a pedestrian device still broadcasts a V2P message in real time or periodically. This causes mistaken reporting and an alarm to the vehicle that the person takes and a vehicle near the person, interferes with normal driving of the vehicle, and may even cause a safety accident.

SUMMARY

Embodiments of the present disclosure disclose an information processing method, a related device, and a computer storage medium, to resolve a problem that user equipment mistakenly reports a V2P message when a person is in a vehicle.

According to a first aspect, an embodiment of the present disclosure provides an information processing method. The method includes obtaining, by a control platform, request information, where the request information carries an identifier of user equipment and an identifier of a vehicle-mounted device, and sending, by the control platform, indication information to the user equipment based on the request information, where the indication information is used to instruct the user equipment to disable or enable a V2P function, to forbid or allow transmission of a V2P message between the vehicle-mounted device and the user equipment.

Implementing this embodiment of the present disclosure can resolve a problem that is when a person is in a vehicle, user equipment corresponding to the person still broadcasts a V2P message, resulting in mistaken reporting and an alarm to the vehicle that the person takes and a neighboring vehicle.

In a possible implementation, if the request information is first request information, where the first request information is used to request the user equipment to disable the V2P function, sending indication information to the user equipment based on the request information includes sending first indication information to the user equipment when the control platform determines, based on the identifier of the user equipment and the identifier of the vehicle-mounted device, that a preset ride condition is satisfied, where the first indication information is used to instruct the user equipment to disable the V2P function.

In a possible implementation, the preset ride condition includes at least one of the following: (1) a device type of the user equipment is different from a device type of the vehicle-mounted device, (2) the user equipment and the vehicle-mounted device are located in a same serving cell, or (3) a distance between the user equipment and the vehicle-mounted device is within a preset range.

The control platform stores at least one of the following information corresponding to the preset ride condition a device type corresponding to the identifier of the user equipment and a device type corresponding to the identifier of the vehicle-mounted device, serving cells in which the user equipment and the vehicle-mounted device are respectively located when the user equipment and the vehicle-mounted device each access a network, or geographical locations respectively reported by the user equipment and the vehicle-mounted device.

In a possible implementation, the first request information is sent by a target device to the control platform when the target device detects that a user corresponding to the user equipment is in a vehicle corresponding to the vehicle-mounted device. The target device includes at least one of the user equipment, the vehicle-mounted device, or a network device. The network device is a device used when the user equipment and the vehicle-mounted device communicate with each other.

In a possible implementation, when the control platform determines, based on the identifier of the user equipment and the identifier of the vehicle-mounted device, that the preset ride condition is satisfied, the method further includes creating and storing an association relationship between the user equipment and the vehicle-mounted device.

In a possible implementation, if the request information is second request information, where the second request information is used to request the user equipment to enable the V2P function, sending indication information to the user equipment based on the request information includes sending second indication information to the user equipment, where the second indication information is used to indicate that the user equipment is allowed to enable the V2P function.

In a possible implementation, the second request information is sent by a target device to the control platform when the target device detects that a user corresponding to the user equipment is not in a vehicle corresponding to the vehicle-mounted device. The target device includes at least one of the user equipment, the vehicle-mounted device, or a network device. The network device is a device used when the user equipment and the vehicle-mounted device communicate with each other.

In a possible implementation, the second request information is used to request to cancel an association relationship that is between the user equipment and the vehicle-mounted device and that is stored on the control platform, to allow the user equipment to enable the V2P function.

In a possible implementation, when the user equipment and the vehicle-mounted device communicate with each other using the network device, the method further includes sending a first notification message to the network device, where the first notification message is used to notify the network device that the V2P function of the user equipment has been disabled or enabled.

Further, when the request information is the first request information and is used to request the user equipment to disable the V2P function, to reduce transmission resource overheads of a device, the first notification message may be used to notify the network device that the V2P function has been disabled, and forbid the network device to send or receive a V2P message to/from the user equipment.

In a possible implementation, the method further includes sending a second notification message to the vehicle-mounted device, where the second notification message carries the identifier of the user equipment, and is used to notify the vehicle-mounted device that the transmission of the V2P message between the vehicle-mounted device and the user equipment is forbidden or allowed.

According to a second aspect, an embodiment of the present disclosure provides another information processing method. The method includes receiving, by user equipment, indication information sent by a control platform, where the indication information is used to instruct the user equipment to disable or enable a V2P function, to forbid or allow the user equipment to transmit a V2P message, and disabling or enabling, by the user equipment, the V2P function of the user equipment based on an indication of the indication information.

In a possible implementation, before receiving, by user equipment, indication information sent by a control platform, the method further includes sending, by the user equipment, request information to the control platform, where the request information carries an identifier of the user equipment and an identifier of a vehicle-mounted device, and is used to request the user equipment to disable or enable the V2P function, to forbid or allow transmission of a V2P message between the vehicle-mounted device and the user equipment.

In a possible implementation, if the request information is first request information, the indication information is first indication information, where the first request information is used to request the user equipment to disable the V2P function, and the first indication information is used to instruct the user equipment to disable the V2P function.

If the request information is second request information, the indication information is second indication information, where the second request information is used to request the user equipment to enable the V2P function, and the second indication information is used to instruct the user equipment to enable the V2P function.

According to a third aspect to a fifth aspect, an embodiment of the present disclosure provides a network device, including a functional unit configured to perform the method according to the first aspect.

According to a sixth aspect, an embodiment of the present disclosure provides user equipment, including a functional unit configured to perform the method according to the second aspect.

According to a seventh aspect, an embodiment of the present disclosure provides another network device, including a memory, a communications interface, and a processor coupled to the memory and the communications interface. The memory is configured to store an instruction. The processor is configured to execute the instruction. The communications interface is configured to communicate with another device (which may be a user equipment, a vehicle-mounted device, or another network device such as a server) under control of the processor. When executing the instruction, the processor performs the method according to the first aspect.

According to an eighth aspect, an embodiment of the present disclosure provides another user equipment, including a memory, a communications interface, and a processor coupled to the memory and the communications interface. The memory is configured to store an instruction. The processor is configured to execute the instruction. The communications interface is configured to communicate with another device (which may be a vehicle-mounted device or a network device) under control of the processor. When executing the instruction, the processor performs the method according to the second aspect.

According to a ninth aspect, a computer-readable storage medium is provided. The computer-readable storage medium stores program code used for information processing. The program code includes an instruction used to perform the method according to the first aspect.

According to a tenth aspect, a computer-readable storage medium is provided. The computer-readable storage medium stores program code used for information processing. The program code includes an instruction used to perform the method according to the second aspect.

According to an eleventh aspect, a computer program product including an instruction is provided. When the computer program product runs on a computer, the computer is enabled to perform the method according to the first aspect.

According to a twelfth aspect, a computer program product including an instruction is provided. When the computer program product runs on a computer, the computer is enabled to perform the method according to the second aspect.

Implementing the embodiments of the present disclosure can resolve a problem that is when a person is in a vehicle, user equipment mistakenly reports a V2P message, a false alarm is further generated, and a safety risk is caused.

BRIEF DESCRIPTION OF DRAWINGS

To describe the technical solutions in some of the embodiments of the present disclosure more clearly, the following briefly describes the accompanying drawings describing some of the embodiments.

DESCRIPTION OF EMBODIMENTS

The following describes the technical solutions in the embodiments of the present disclosure in detail with reference to the accompanying drawings in the present disclosure.

Figure 1:
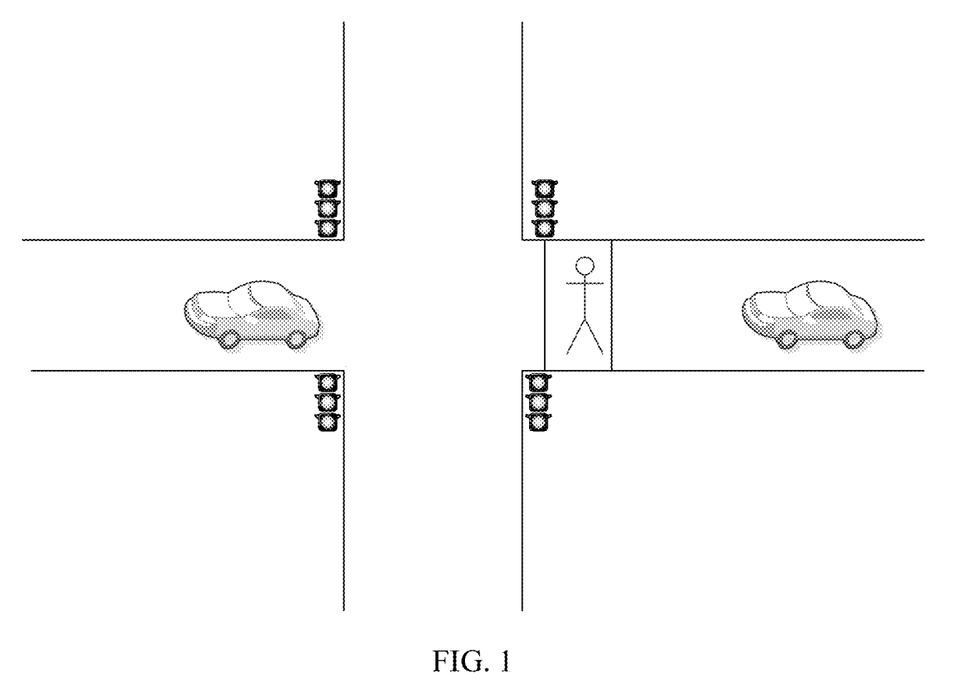
FIG. 1 is a schematic diagram of an example scenario according to the present disclosure.

In a process of proposing this application, the applicant finds that in V2P communication, as shown in FIG. 1, when a vehicle and a pedestrian approach each other, the vehicle (a vehicle-mounted device corresponding to the vehicle) and the pedestrian (a user equipment corresponding to the pedestrian) each may broadcast a V2P message in real time or periodically. The V2P message may include information such as a location, a speed, an acceleration, and a movement track of the vehicle/pedestrian. Correspondingly, the vehicle may raise a safety alarm based on the V2P message sent by the user equipment, and the pedestrian (the user equipment) may raise a safety alarm based on the V2P message sent by the vehicle. However, when a person is in the vehicle, user equipment still broadcasts a V2P message. This causes mistaken reporting and an alarm to the vehicle that the pedestrian takes and a vehicle near the pedestrian, and may cause a safety accident.

Figure 2:
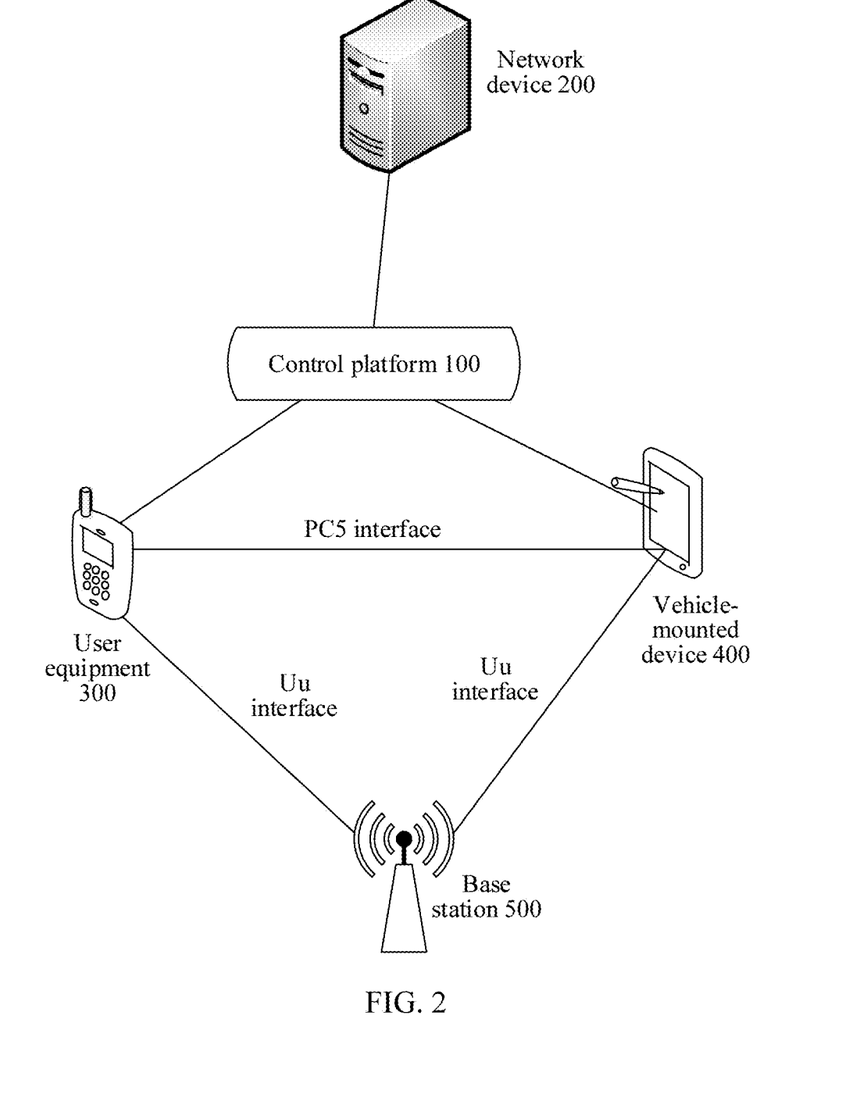
FIG. 2 is a schematic diagram of a network framework according to an embodiment of the present disclosure.

To resolve the foregoing problem, this application provides an information processing method and a network framework to which the method is applicable. FIG. 2 is a schematic diagram of a network framework according to an embodiment of the present disclosure. As shown in FIG. 2, the network framework includes a control platform 100, a network device 200, user equipment 300, and a vehicle-mounted device 400. Optionally, the network framework may further include a base station 500. Respective quantities of user equipments, vehicle-mounted devices, and network devices are not limited. For example, FIG. 2 shows one user equipment, one vehicle-mounted device, and one network device.

Further, the control platform 100 may be configured to be responsible for service authorization and parameter provisioning in Internet-of-vehicles (vehicle to everything (V2X)) communication, for example, whether to allow enabling of a V2P function of the user equipment. The control platform may be further configured to receive request information sent by a device (which may be any one or any combination of the network device, the user equipment, and the vehicle-mounted device), and determine whether the request information satisfies a preset ride condition, to subsequently control the device to or not to transmit a V2X message. Details are described below. In this application, the control platform may be used as a network device and deployed on a core network or an application server. This is not limited in the present disclosure.

The network device 200 is configured to forward a V2X message, and may further determine a relationship between a person and a vehicle independently or using another device (for example, a third-party device, the vehicle-mounted device, or the user equipment), and send corresponding request information to the control platform. The relationship indicates whether the person is in the vehicle. Optionally, the network device 200 may further receive a notification message sent by the control platform, and determine a forwarding policy for the V2X message based on the notification message. The function of the network device is described below. The network device 200 herein includes but is not limited to an application server, a switch, another device configured to implement message forwarding between devices, or the like.

The user equipment 300 (a device corresponding to a pedestrian/user side) may be configured to broadcast a V2P message in real time or periodically. The V2P message may include information such as a location, a movement speed, a movement direction, and a status of the user. Optionally, the user equipment may further receive a V2X message sent by a neighboring device (for example, a vehicle-mounted device on a neighboring vehicle, or an RSU), and further determine, based on the received V2X message, whether the user is in danger, and if the user is in danger, raise a safety alarm.

The vehicle-mounted device 400 (a device corresponding to a vehicle side) may be configured to broadcast a V2X message in real time or periodically. The V2X message includes information such as a location, a movement speed, a movement direction, and a status of the vehicle. Optionally, the vehicle-mounted device may further receive a V2X message sent by a neighboring device (for example, user equipment or a vehicle-mounted device on a neighboring vehicle), and further determine, based on the received V2X message, whether the vehicle is in danger, and if the vehicle is in danger, raise an alarm.

It should be noted that a device in the Internet of vehicles supports both short-range communication and long-range communication. For example, in actual application, short-range communication between user equipment and a vehicle-mounted device in the Internet of vehicles may be implemented over a PC5 interface, and long-range communication may be implemented over a Uu air interface using the base station 500.

Figure 3:
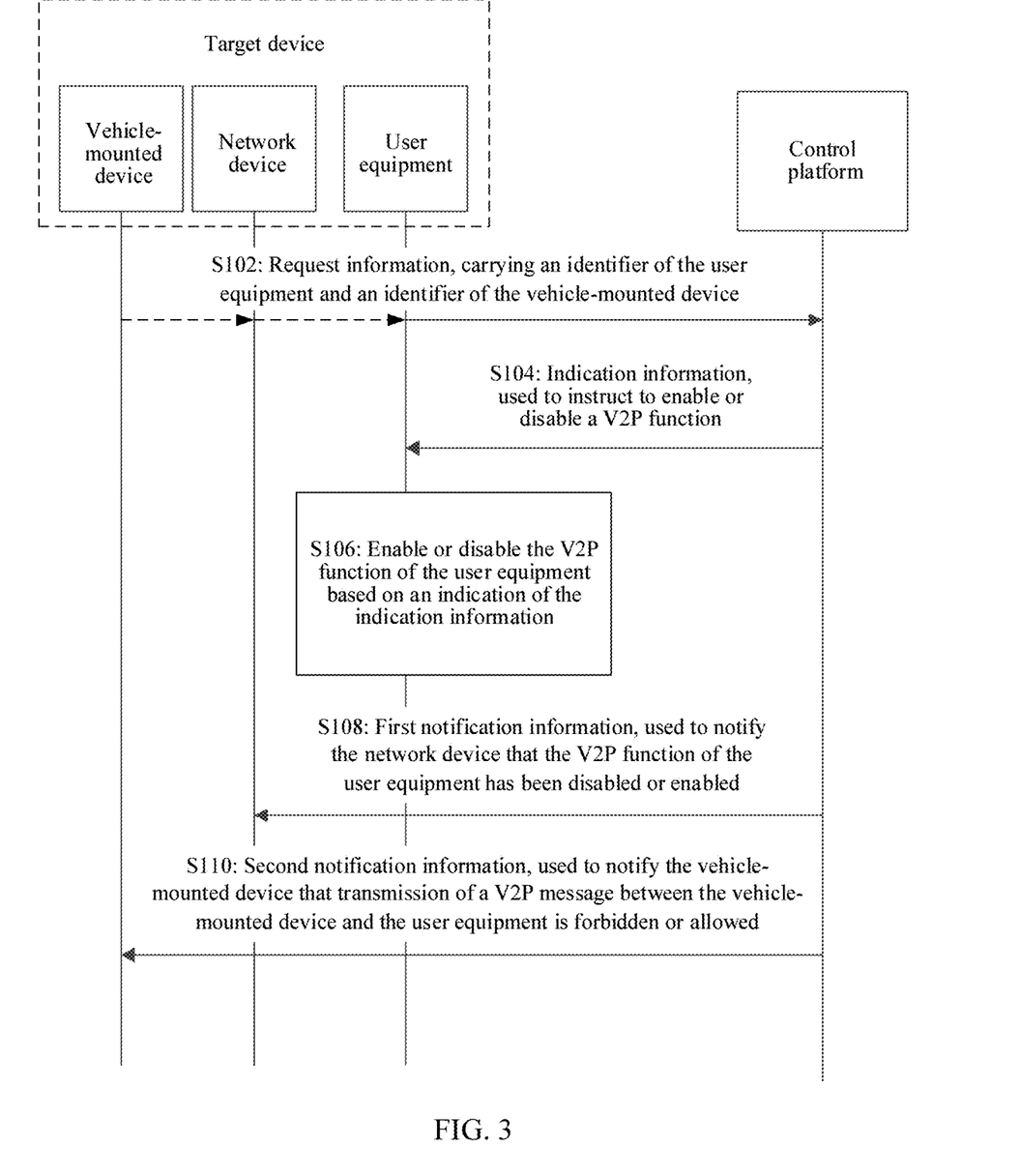
FIG. 3 is a schematic flowchart of an information processing method according to an embodiment of the present disclosure.

Based on the network framework shown in FIG. 2, the following describes embodiments related to an information processing method provided in this application. FIG. 3 is a schematic flowchart of an information processing method. The method shown in FIG. 3 includes the following implementation steps.

Step S102: A target device sends request information to a control platform, where the request information carries an identifier of user equipment and an identifier of a vehicle-mounted device, and is used to request the user equipment to disable or enable a V2P function, to forbid or allow the user equipment to receive or send a V2P message. Correspondingly, the control platform receives the request information.

In this application, the request information may be automatically generated by the target device, or the request information may be request information sent by another device and then forwarded by the target device. For example, the request information is automatically generated by the target device. There are the following two implementations.

In a first implementation, when detecting that a user corresponding to the user equipment is in a vehicle corresponding to the vehicle-mounted device, the target device may send first request information to the control platform.

The first request information is used to request the user equipment to disable the V2P function.

In a second implementation, when detecting that a user corresponding to the user equipment leaves or is not in a vehicle corresponding to the vehicle-mounted device, the target device may send second request information to the control platform. The second request information is used to request the user equipment to enable the V2P function.

An implementation of detecting, by the target device, whether the user is in the vehicle includes but is not limited to biometric recognition, camera recognition, chip recognition, card swiping recognition (for example, a card swiping apparatus is installed in the vehicle), comprehensively determining a relationship between the user and the vehicle (the user is in or not in the vehicle) using a third-party platform, or intelligently determining the relationship between the user and the vehicle based on movement information of the vehicle and the user. The movement information includes but is not limited to location information, speed information, acceleration information, and the like. The camera recognition is used as an example. The target device collects an image taken by a camera. The image includes the user corresponding to the user equipment and the vehicle corresponding to the vehicle-mounted device. Then the target device determines the relationship between the user and the vehicle through image analysis. The relationship indicates that the user is or is not in the vehicle.

The target device may be any one or any combination of the user equipment, the vehicle-mounted device, or a network device. The network device herein is a network device used when the user equipment communicates with the vehicle-mounted device over a Uu interface, for example, a base station or a server.

Step S104: The control platform sends indication information to the user equipment based on the request information, where the indication information is used to instruct the user equipment to disable or enable the V2P function, to forbid or allow the user equipment to receive or send a V2P message. Correspondingly, the user equipment receives the indication information.

Correspondingly, there are the following several specific implementations of step S104.

In a first implementation, when the request information is the first request information, the control platform may directly send first indication information to the user equipment in response to the first request information. The first indication information is used to instruct the user equipment to disable the V2P function. That is, after receiving the first request information, the control platform may directly allow the user equipment to disable the V2P function, and feed back the first indication information.

In a second implementation, when the request information is the first request information, the control platform may determine, based on the identifier of the user equipment and the identifier of the vehicle-mounted device that are in the first request information, whether the user equipment and the vehicle-mounted device satisfy a preset ride condition. If the user equipment and the vehicle-mounted device satisfy the preset ride condition, the control platform sends first indication information to the user equipment in response to the first request information. The first indication information is used to instruct the user equipment to disable the V2P function, to forbid the user equipment to send or receive (that is, transmit) a V2P message.

In an optional embodiment, the preset ride condition is customized by a user side or a device side, and is used to determine the relationship between the user and the vehicle.

The preset ride condition may include but is not limited to any one or any combination of the following conditions: (1) a device type of the user equipment is different from a device type of the vehicle-mounted device, (2) the user equipment and the vehicle-mounted device are located in a same serving cell, or (3) a distance between the user equipment and the vehicle-mounted device is within a preset range.

The control platform may prestore any one or any combination of the following information corresponding to the preset ride condition: (1) the device type of the user equipment and the device type of the vehicle-mounted device, (2) serving cells in which the user equipment and the vehicle-mounted device are respectively located when the user equipment and the vehicle-mounted device each access a network (connect to the network), or (3) geographical locations respectively reported by the user equipment and the vehicle-mounted device.

In an optional embodiment, when determining that the user equipment and the vehicle-mounted device satisfy the preset ride condition, the control platform may further create and store an association relationship between the user equipment and the vehicle-mounted device.

In a third implementation, when the request information is the second request information, the control platform may directly send second indication information to the user equipment in response to the second request information. The second indication information is used to instruct the user equipment to enable the V2P function. That is, after receiving the second request information, the control platform may directly allow the user equipment to enable the V2P function, and feed back the second indication information.

In a fourth implementation, when the request information is the second request information, the control platform may send second indication information to the user equipment in response to the second request information. The second indication information is used to instruct the user equipment to enable the V2P function, to allow the user equipment to normally receive or send a V2P message, and raise a safety alarm when the user approaches a vehicle.

In an optional embodiment, the second request information may be used to request to cancel an association relationship between the user equipment and the vehicle-mounted device, to support/allow the user equipment in enabling/to enable the V2P function. Correspondingly, the control platform receives the second request information, and then in response to the second request information, may update (that is, cancel) the association relationship that is between the user equipment and the vehicle-mounted device and that is stored on the control platform, and send the second indication information to the user equipment. In this case, the second indication information is used to notify the user equipment that the association relationship between the user equipment and the vehicle-mounted device has been canceled, and allow the user equipment to enable the V2P function.

Step S106: The user equipment disables or enables the V2P function of the user equipment based on an indication of the indication information.

Further, if the user equipment receives the first indication information, the user equipment disables the V2P function based on an indication of the first indication information, to forbid transmission of a V2P message to/from the user equipment. If the user equipment receives the second indication information, the user equipment enables the V2P function of the user equipment based on an indication of the second indication information, to allow the user equipment to transmit (that is, send/receive) a V2P message.

In an optional embodiment, the method may further include the following steps S108 and S110.

Step S108: The control platform sends a first notification message to the network device, where the first notification message is used to notify the network device that the V2P function of the user equipment has been disabled or enabled.

Further, when the user equipment communicates with the vehicle-mounted device over a Uu interface, that is, the user equipment and the vehicle-mounted device need to communicate with each other using the network device, the control platform may further send the first notification message to the network device, to correspondingly notify the network device that the V2P function of the user equipment has been disabled or enabled.

Optionally, when the first notification message is used to notify the network device that the V2P function of the user equipment has been disabled, the first notification message may be used to notify the network device that the network device is forbidden to transmit (send or receive) a V2P message to/from the user equipment, to save a transmission resource. Correspondingly, if transmission resource overheads are not considered, the first notification message may alternatively be used to notify the network device that the network device is allowed to transmit a V2P message to/from the user equipment. It may be understood that, in actual application, if the V2P function of the user equipment has been disabled, the user equipment no longer sends a V2P message. Correspondingly, when the network device does not receive the first notification message, no V2P message to/from the user equipment can be received or sent.

Step S110: The control platform sends a second notification message to the vehicle-mounted device, where the second notification message carries the identifier of the user equipment, and is used to notify the vehicle-mounted device that transmission of a V2P message between the vehicle-mounted device and the user equipment is forbidden or allowed.

Further, the control platform may further send the second notification message to the vehicle-mounted device, to correspondingly notify the vehicle-mounted device that the transmission of the V2P message between the vehicle-mounted device and the user equipment is forbidden or allowed.

Figure 4:
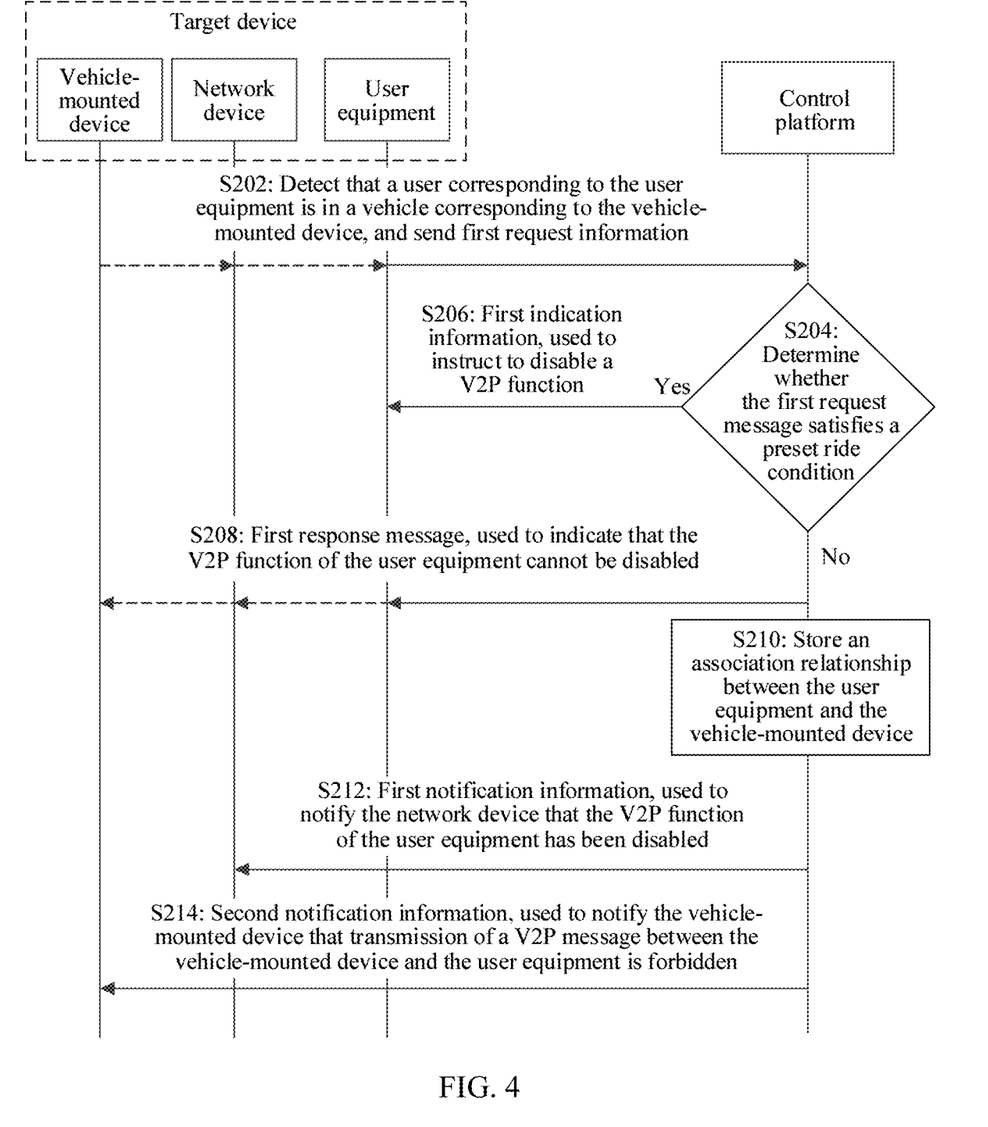
FIG. 4 is a schematic flowchart of another information processing method according to an embodiment of the present disclosure.
Figure 5:
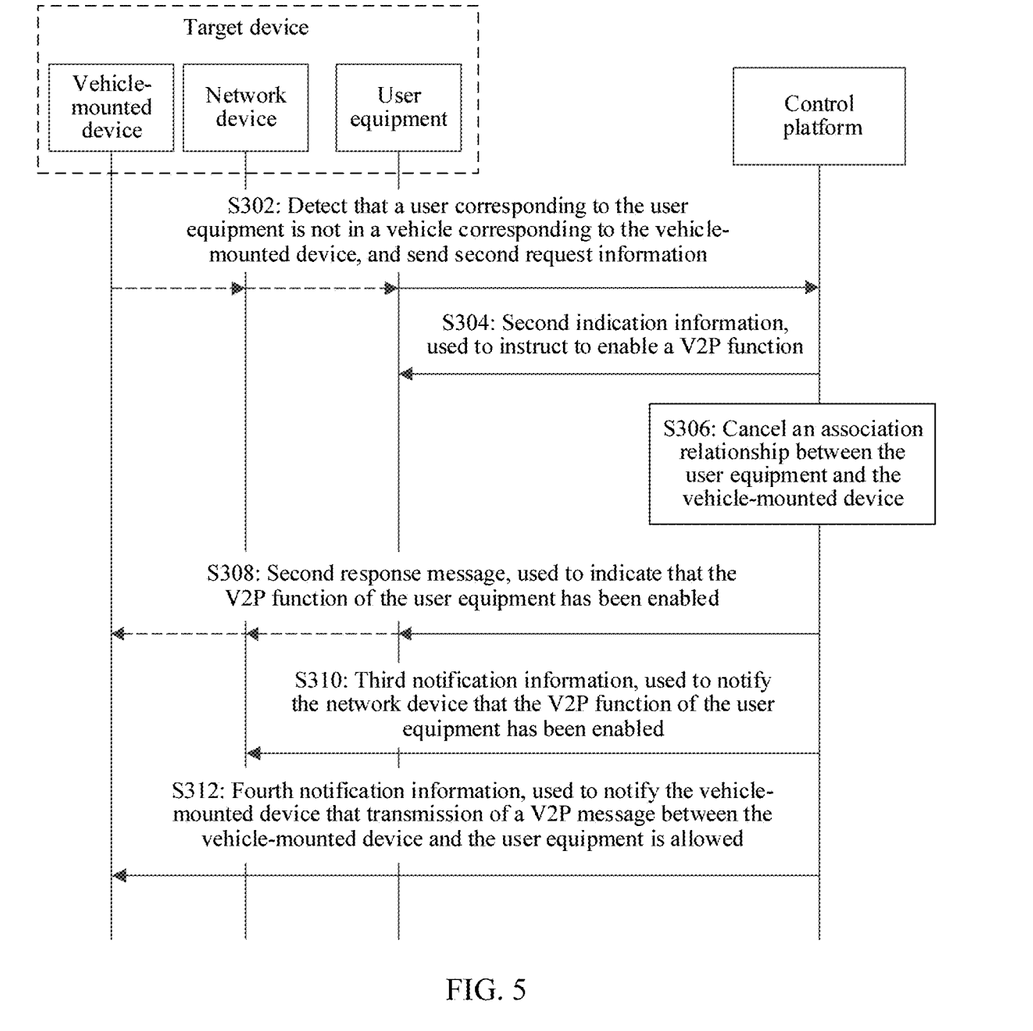
FIG. 5 is a schematic flowchart of still another information processing method according to an embodiment of the present disclosure.

Referring to FIG. 4 and FIG. 5, specific embodiments corresponding to disabling and enabling of the V2P function by the user equipment are separately described. A specific embodiment in which the user equipment disables the V2P function is first described. FIG. 4 is a schematic flowchart of another information processing method according to an embodiment of the present disclosure. As shown in FIG. 4, the method may include the following implementation steps.

Step S202: When detecting that a user corresponding to user equipment is in a vehicle corresponding to a vehicle-mounted device, a target device sends first request information to a control platform, where the first request information carries an identifier of the user equipment and an identifier of the vehicle-mounted device. Correspondingly, the control platform receives the first request information.

In this application, the target device may be any one or any combination of the user equipment, the vehicle-mounted device, or a network device. The network device is a network device that needs to be used when the user equipment communicates with the vehicle-mounted device over a Uu interface, for example, a base station or a server.

In an optional embodiment, the first request message may be generated by the target device when detecting that the user is in the vehicle, or may be generated by another device when detecting that the user is in the vehicle, and then forwarded by the target device to the control platform. For example, the first request message is generated by the target device. A specific implementation of detecting, by the target device, whether the user is in the vehicle includes but is not limited to any one or any combination of biometric recognition, camera recognition, chip recognition, card swiping recognition (for example, a card swiping apparatus is installed in the vehicle), comprehensively determining a relationship between the user and the vehicle using a third-party platform (for example, a shared vehicle obtains, based on both ride confirmation instructions respectively sent by the user and the vehicle, the relationship using a third-party platform), intelligently determining the relationship between the user and the vehicle based on movement information of the vehicle and the user, or the like. The movement information includes but is not limited to location information, speed information, acceleration information, and the like. The relationship indicates that the user is in the vehicle, or the user is not in the vehicle.

For example, a shared vehicle performs determining using a third-party platform. When a user A selects a shared vehicle B for traveling, the user A may make an appointment with a third-party platform (or a server) to select the shared vehicle B. When detecting that the user A uses the shared vehicle B, for example, detecting, using a camera, that the user A opens a door of the shared vehicle B, the shared vehicle B may send notification information to the third-party platform, to notify the third-party platform that the user A takes the shared vehicle B. Correspondingly, the third-party platform may determine, based on both appointment information and the notification information that are received, that the user A takes the shared vehicle B. Optionally, alternatively, after the user A enters the shared vehicle B, the user A and the shared vehicle B each send notification information to the third-party platform, to notify the third-party platform that the user A takes the shared vehicle B. Correspondingly, the third-party platform may determine, based on the notification information from the user A and the shared vehicle B, that the user A takes the shared vehicle B, that is, the user A is in the shared vehicle B.

Step S204: The control platform determines, based on the identifier of the user equipment and the identifier of the vehicle-mounted device, whether a preset ride condition is satisfied.

The preset ride condition is customized by a user side or a device side, and is used to determine a relationship between the user corresponding to the user equipment and the vehicle corresponding to the vehicle-mounted device (that is, whether the user is in the vehicle). For example, the preset ride condition includes but is not limited to any one or any combination of the following: a device type of the user equipment is different from a device type of the vehicle-mounted device, the device types of the user equipment and the vehicle-mounted device are specified (for example, may be respectively set to a handheld device and a vehicle-mounted device), the user equipment and the vehicle-mounted device are located in a same serving cell, a distance between the user equipment and the vehicle-mounted device is within a preset range, or another specified condition used to determine whether the user is in the vehicle. This is not limited in this application.

To determine whether the first request information satisfies the preset ride condition, the control platform may prestore any one or any combination of the following information corresponding to the preset ride condition: device types respectively corresponding to the identifier of the user equipment and the identifier of the vehicle-mounted device, that is, the device type of the user equipment and the device type of the vehicle-mounted device, serving cells in which the user equipment and the vehicle-mounted device are respectively located when the user equipment and the vehicle-mounted device each connect to/access a network, geographical locations respectively reported by the user equipment and the vehicle-mounted device in real time or periodically, or the like.

For example, the preset ride condition is that the user equipment and the vehicle-mounted device are located in the same serving cell. After receiving the first request information, the control platform may parse the first request information to learn of the identifier of the user equipment and the identifier of the vehicle-mounted device. Next, the control platform obtains a serving cell corresponding to the identifier of the user equipment and a serving cell corresponding to the identifier of the vehicle-mounted device from the control platform, that is, obtains the serving cells, stored on the control platform, in which the user equipment and the vehicle-mounted device are respectively located when the user equipment and the vehicle-mounted device each access the network. Then, the control platform determines whether the two serving cells are the same. If the two serving cell are the same, the control platform may determine that the user corresponding to the user equipment is in the vehicle corresponding to the vehicle-mounted device. To be specific, the identifier of the user equipment and the identifier of the vehicle-mounted device satisfy the preset ride condition. If the two serving cell are not the same, the control platform determines that the user corresponding to the user equipment is not in the vehicle corresponding to the vehicle-mounted device. To be specific, the identifier of the user equipment and the identifier of the vehicle-mounted device do not satisfy the preset ride condition.

Step S206: The control platform sends first indication information to the user equipment when determining, based on the identifier of the user equipment and the identifier of the vehicle-mounted device, that the preset ride condition is satisfied. The first indication information is used to instruct the user equipment to disable a V2P function, to forbid the user equipment to transmit a V2P message, that is, to forbid transmission of a V2P message between the user equipment and the vehicle-mounted device.

Correspondingly, the user equipment receives the first indication information, and disables the V2P function of the user equipment based on an indication of the first indication information, to no longer receive or send any V2P message.

Step S208: The control platform returns a first response message to the target device when determining, based on the identifier of the user equipment and the identifier of the vehicle-mounted device, that the preset ride condition is not satisfied, where the first response message is used to notify the target device that the first request information does not satisfy the preset ride condition and that the V2P function of the user equipment cannot be disabled.

Further, the target device may be any one or more of the user equipment, the vehicle-mounted device, and the network device. Therefore, as shown in FIG. 4, the control platform may send the first response message for the first request information to the target device (that is, any one or more of the foregoing three devices). The first response message is used to feed back/notify the target device that the identifier of the user equipment and the identifier of the vehicle-mounted device that are in the first request information do not satisfy the preset ride condition, and that the V2P function of the user equipment is not disabled. That is, the V2P function of the user equipment can be normally used in this case. Optionally, the first response message may be further used to notify the target device of a specific reason why the preset ride condition is not satisfied, for example, the user equipment cannot take the vehicle corresponding to the vehicle-mounted device, that is, the user corresponding to the user equipment is not in the vehicle corresponding to the vehicle-mounted device.

In an optional embodiment, when the control platform determines, based on the identifier of the user equipment and the identifier of the vehicle-mounted device, that the preset ride condition is satisfied, the method shown in FIG. 4 further includes the following implementation steps.

Step S210: The control platform creates and stores an association relationship (that is, a binding relationship) between the user equipment and the vehicle-mounted device.

Step S212: When the user equipment and the vehicle-mounted device need to communicate with each other using the network device, the control platform sends a first notification message to the network device, where the first notification message is used to notify the network device that the V2P function of the user equipment has been disabled.

Further, when the user equipment communicates with the vehicle-mounted device over the Uu interface, an intermediate device (that is, the network device) needs to be used. In this case, the control platform may further send the first notification message to the network device. The first notification message carries the identifier of the user equipment, and is used to notify the network device that the V2P function of the user equipment has been disabled. Optionally, the first notification message may further carry information such as the identifier of the vehicle-mounted device.

To reduce transmission resource overheads, the first notification message may be used to notify the network device that the V2P function of the user equipment has been disabled, forbid the network device to transmit a V2P message to/from the user equipment, and definitely, forbid the network device to forward a V2P message transmitted between the user equipment and the vehicle-mounted device. For example, the network device is forbidden to forward a V2P message from the user equipment to the vehicle-mounted device, or the network device is forbidden to forward a V2P message from the vehicle-mounted device to the user equipment.

Correspondingly, when reduction in transmission overheads is not considered, the first notification message may be used to notify the network device that the V2P function of the user equipment has been disabled, and the network device does not need to be further forbidden to transmit a V2P message to/from the user equipment. In actual application, when the V2P function of the user equipment has been disabled, no V2P message is received or sent. Correspondingly, even if the first notification message is not sent, the network device does not forward or receive a V2P message to/from the user equipment.

Step S214: The control platform sends a second notification message to the vehicle-mounted device, where the second notification message carries the identifier of the user equipment, and is used to notify the vehicle-mounted device that the transmission of the V2P message between the vehicle-mounted device and the user equipment is forbidden.

Further, the control platform may further send the second notification message to the vehicle-mounted device. The second notification message carries the identifier of the user equipment, and is used to forbid the vehicle-mounted device to send or receive a V2P message to/from the user equipment, and definitely, forbid the transmission of the V2P message between the vehicle-mounted device and the user equipment. Further, the vehicle-mounted device is forbidden to send a V2P message to the user equipment, and is also forbidden to receive a V2P message from the user equipment.

The following describes an embodiment in which the user equipment enables the V2P function. FIG. 5 is a schematic flowchart of still another information processing method according to an embodiment of the present disclosure. The method shown in FIG. 5 includes the following implementation steps.

Step S302: When detecting that a user corresponding to user equipment is not in a vehicle corresponding to a vehicle-mounted device, a target device sends second request information to a control platform, where the second request information carries an identifier of the user equipment and an identifier of the vehicle-mounted device. Correspondingly, the control platform receives the second request information.

The target device may be any one or any combination of the user equipment, the vehicle-mounted device, or a network device. Further, the second request information may be generated by the target device when detecting that the user leaves or is not in the vehicle, or the second request information may be generated by another device when detecting that the user leaves or is not in the vehicle, and then forwarded by the target device, or the like. For a manner of detecting whether the user is in the vehicle, refer to related descriptions in the foregoing embodiment. Details are not described herein again.

The second request information is used to request the user equipment to enable a V2P function. Optionally, the second request information may be used to request to cancel an association relationship that is between the user equipment and the vehicle-mounted device and that is stored on the control platform, to request to enable the V2P function of the user equipment.

Step S304: The control platform sends second indication information to the user equipment in response to the second request information, where the second indication information is used to instruct the user equipment to enable the V2P function, to allow the user equipment to transmit a V2P message.

Further, after receiving the second request information, the control platform may update or cancel, in response to the second request information, the association relationship that is between the user equipment and the vehicle-mounted device and that is stored on the control platform, to allow/support enabling of the V2P function of the user equipment, that is, support sending or receiving of a V2P message to/from the user equipment. Further, the control platform may further send the second indication information to the user equipment, to indicate that the user equipment is allowed to enable the V2P function, to support the user equipment in receiving/sending (that is, transmitting) a V2P message. Optionally, the second indication information further carries a first deletion indication, used to instruct to delete the identifier, of the vehicle-mounted device, stored on the user equipment, to allow transmission of a V2P message between the user equipment and the vehicle-mounted device.

Correspondingly, the user equipment receives the second indication information, and enables the V2P function of the user equipment based on an indication of the second indication information, to allow the user equipment to receive or send a V2P message, and definitely, allow the transmission of the V2P message between the user equipment and the vehicle-mounted device.

In an optional embodiment, after the control platform responds to the second request information, the method shown in FIG. 5 may further include the following implementation steps.

Step S306: The control platform cancels an association relationship between the user equipment and the vehicle-mounted device.

Step S308: The control platform sends a second response message to the target device, where the second response message is used to notify the target device that the user equipment is currently allowed to enable the V2P function of the user equipment.

Further, after responding to the second request information, the control platform may update/cancel the association relationship between the user equipment and the vehicle-mounted device. Further, the control platform may further send the second response message for the second request information to the target device. The second response message is used to notify the target device that the control platform has updated/canceled the association relationship between the user equipment and the vehicle-mounted device, and that the user equipment is currently allowed to enable the V2P function, that is, transmission of a V2P message to/from the user equipment is supported.

Step S310: When the user equipment and the vehicle-mounted device need to communicate with each other using the network device, the control platform sends a third notification message to the network device, where the third notification message is used to notify the network device that the V2P function of the user equipment has been enabled.

Further, when the user equipment communicates with the vehicle-mounted device over a Uu interface, an intermediate device (that is, the network device) needs to be used to implement message forwarding. Correspondingly, the control platform may further send the third notification message to the network device in this application. The third notification message may carry the identifier of the user equipment, and is used to notify the network device that the user equipment is currently allowed to enable the V2P function of the user equipment, that is, the network device is supported/allowed in transmitting/to transmit a V2P message to/from the user equipment, and definitely, the transmission of the V2P message between the user equipment and the vehicle-mounted device is supported. Optionally, the third notification message may further carry information such as the identifier of the vehicle-mounted device. This is not limited in this application.

Step S312: The control platform sends a fourth notification message to the vehicle-mounted device, where the fourth notification message carries the identifier of the user equipment, and is used to notify the vehicle-mounted device that the transmission of the V2P message between the vehicle-mounted device and the user equipment is allowed.

Further, the control platform may further send the fourth notification message to the vehicle-mounted device. The fourth notification message carries the identifier of the user equipment, and is used to notify the vehicle-mounted device that the vehicle-mounted device is allowed to send/receive (that is, transmit) a V2P message to/from the user equipment, that is, the transmission of the V2P message between the vehicle-mounted device and the user equipment is allowed. That is, the vehicle-mounted device is allowed to send a V2P message to the user equipment, and is also allowed to receive a V2P message from the user equipment.

Implementing the embodiments of the present disclosure can resolve a problem that is when a person is in a vehicle, user equipment mistakenly reports a V2P message, a false alarm is further generated, and a safety risk is caused.

The foregoing mainly describes the solutions provided in the embodiments of the present disclosure from a perspective of interaction between the target device (which may be the user equipment, the vehicle-mounted device, or the like) and the control platform. In actual application, the control platform may be used as a network device and deployed on a core network or a server. It may be understood that, to implement the foregoing functions, a first device (which may be the user equipment or a network device on which the control platform is deployed) includes corresponding hardware structures and/or software modules for performing the functions. In combination with the examples described in the embodiments disclosed in the present disclosure, the units and algorithm steps can be implemented by in a form of hardware or a combination of hardware and computer software in the embodiments of the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions in the embodiments of the present disclosure.

In the embodiments of the present disclosure, the first device may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that division into the units in the embodiments of the present disclosure is an example, is merely logical function division and may be other division in actual implementation.

Figure 6A:
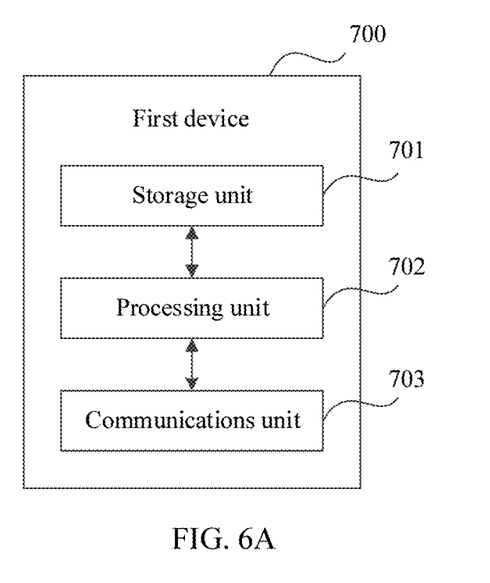
FIG. 6A is a schematic structural diagram of a first device according to an embodiment of the present disclosure.

When an integrated unit is used, FIG. 6A is a possible schematic structural diagram of the first device in the foregoing embodiments. A first device 700 includes a processing unit 702 and a communications unit 703. The processing unit 702 is configured to control and manage an action of the first device 700.

In a possible embodiment, when the first device 700 is a network device 700, the processing unit 702 is configured to support the network device 700 in performing steps S204 and S210 in FIG. 4, step S306 in FIG. 5, and/or another step of the technology described in this specification. The communications unit 703 is configured to support the network device 700 in communicating with another device. For example, the communications unit 703 is configured to support the network device 700 in performing steps S104, S108, and S110 in FIG. 3, and steps S206, S208, S212, and S214 in FIG. 4, steps S304, S308, S310, and S312 in FIG. 5, and/or another step of the technology described in this specification.

In another possible embodiment, when the first device 700 is user equipment 700, the processing unit 702 is configured to support the network device 700 in performing step S106 in FIG. 3, and/or another step of the technology described in this specification. The communications unit 703 is configured to support the network device 700 in communicating with another device. For example, the communications unit 703 is configured to support the network device 700 in performing step S102 in FIG. 3, step S202 in FIG. 4, step S302 in FIG. 5, and/or another step of the technology described in this specification.

Optionally, the first device 700 may further include a storage unit 701 configured to store program code and data of the first device 700.

The processing unit 702 may be a processor or a controller, such as a central processing unit (CPU), a general-purpose processor, a digital signal processor (DSP), an application-specific integrated circuit (ASIC), a field-programmable gate array (FPGA), or another programmable logic device, a transistor logic device, a hardware component, or any combination thereof. The processor or the controller can implement or execute various example logical blocks, modules, and circuits described with reference to content disclosed in the present disclosure. The processor may be a combination of processors implementing a computing function, for example, a combination of one or more microprocessors, or a combination of the DSP and a microprocessor. The communications unit 703 may be a communications interface, a transceiver, a transceiver circuit, or the like. The communications interface is a generic term, and may include one or more interfaces, for example, an interface between a network device and another device. The storage unit 701 may be a memory.

Figure 6B:
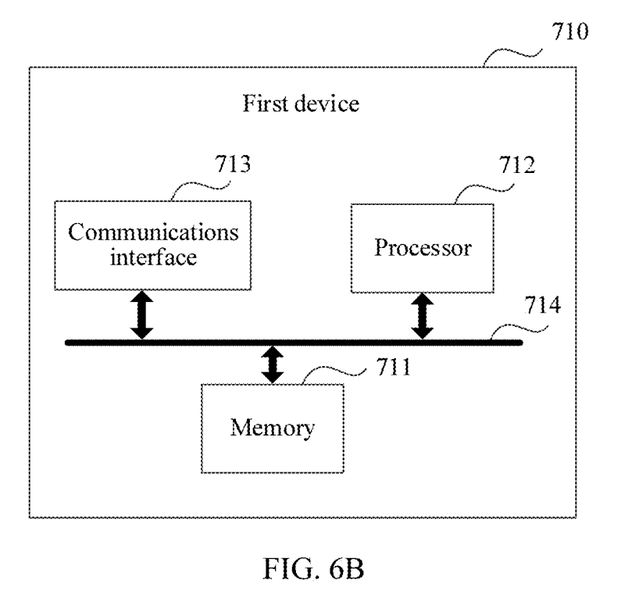
FIG. 6B is a schematic structural diagram of another first device according to an embodiment of the present disclosure.

When the processing unit 702 is the processor, the communications unit 703 is the communications interface, and the storage unit 701 is the memory, the first device in the embodiments of the present disclosure may be a first device shown in FIG. 6B.

As shown in FIG. 6B, the first device 710 includes a processor 712, a communications interface 713, and a memory 711. Optionally, the first device 710 may further include a bus 714. The communications interface 713, the processor 712, and the memory 77 may be connected to each other using the bus 714. The bus 714 may be a Peripheral Component Interconnect (PCI) bus, an Extended Industry Standard Architecture (EISA) bus, or the like. The bus 714 may be classified as an address bus, a data bus, a control bus, or the like. For ease of representation, only one thick line is used to represent the bus 714 in FIG. 6B, but this does not mean that there is only one bus or only one type of bus.

For specific implementation of the first device shown in FIG. 6A or FIG. 6B, refer to corresponding descriptions in the foregoing method embodiments. Details are not described herein again.

Methods or algorithm steps described in combination with the content disclosed in the embodiments of the present disclosure may be implemented by hardware, or may be implemented by a processor executing a software instruction. The software instruction may include a corresponding software module. The software module may be stored in a random-access memory (RAM), a flash memory, a read-only memory (ROM), an erasable programmable ROM (EPROM), an electrically EPROM (EEPROM), a register, a hard disk, a removable hard disk, a compact disc read-only memory (CD-ROM), or any other form of storage medium well-known in the art. For example, a storage medium is coupled to a processor such that the processor can read information from the storage medium or write information into the storage medium. Definitely, the storage medium may be a component of the processor. The processor and the storage medium may be located in an ASIC. In addition, the ASIC may be located in a network device. Definitely, the processor and the storage medium may exist in the first device as discrete components.

A person of ordinary skill in the art may understand that all or some of the procedures of the methods in the embodiments may be implemented by a computer program instructing relevant hardware. The program may be stored in a computer-readable storage medium. When the program is executed, the procedures of the methods in the embodiments may be included. The foregoing storage medium includes any medium that can store program code, such as a ROM, a RAM, a magnetic disk, or an optical disc.

What is claimed is:

1. An information processing method implemented by a control platform, wherein the information processing method comprises:
   obtaining request information that carries a first identifier of a user equipment (UE) and a second identifier of a vehicle-mounted device;
   sending first indication information to the UE based on the request information,
   wherein the first indication information instructs the UE to disable a vehicle-to-pedestrian (V2P) function to forbid transmission of a V2P message between the vehicle-mounted device and the UE or to enable the V2P function to allow transmission of the V2P message between the vehicle-mounted device and the UE;
   determining, based on the first identifier and the second identifier, that the UE and the vehicle-mounted device satisfy a preset ride condition;
   sending, to the UE, second indication information instructing the UE to disable the V2P function; and
   storing at least one of the following information corresponding to the preset ride condition:
      a device type corresponding to the first identifier and a device type corresponding to the second identifier;
      serving cells in which the UE and the vehicle-mounted device are respectively located when the UE and the vehicle-mounted device each access a network; or
      geographical locations respectively reported by the UE and the vehicle-mounted device.

2. The information processing method of claim 1, wherein the preset ride condition comprises that a device type of the UE is different from a device type of the vehicle-mounted device.

3. The information processing method of claim 1, wherein the preset ride condition comprises that the UE and the vehicle-mounted device are located in a same serving cell.

4. The information processing method of claim 1, wherein the preset ride condition comprises that a distance between the UE and the vehicle-mounted device is within a preset range.

5. The information processing method of claim 1, further comprising receiving the request information from a target device in response to a user of the UE being in a vehicle corresponding to the vehicle-mounted device, wherein the target device comprises at least one of the UE, the vehicle-mounted device, or a network device, and wherein the network device is used when the UE communicates with the vehicle-mounted device.

6. The information processing method of claim 1, wherein when the UE and the vehicle-mounted device satisfy the preset ride condition, the method further comprises:
   creating an association relationship between the UE and the vehicle-mounted device; and
   storing the association relationship.

7. The information processing method of claim 1, wherein when the request information requests the UE to enable the V2P function, the information processing method further comprises sending, to the UE, third indication information indicating that the UE is allowed to enable the V2P function.

8. The information processing method of claim 7, further comprising receiving the request information from a target device in response to a user corresponding to the UE not being in a vehicle corresponding to the vehicle-mounted device, wherein the target device comprises at least one of the UE, the vehicle-mounted device, or a network device.

9. The information processing method of claim 7, wherein the request information requests to cancel an association relationship that is between the UE and the vehicle-mounted device and that is stored on the control platform to allow the UE to enable the V2P function.

10. The information processing method of claim 1, wherein the information processing method further comprises sending a first notification message to a network device coupling the UE and the vehicle-mounted device, wherein the first notification message notifies the network device that the V2P function of the UE has been disabled.

11. The information processing method of claim 1, wherein the UE and the vehicle-mounted device communicate with each other using a network device, wherein the information processing method further comprises sending a first notification message to the network device coupling the UE and the vehicle-mounted device, and wherein the first notification message notifies the network device that the V2P function of the UE has been enabled.

12. The information processing method of claim 1, further comprising sending a second notification message to the vehicle-mounted device carrying the first identifier, wherein the second notification message notifies the vehicle-mounted device that the transmission of the V2P message between the vehicle-mounted device and the UE is forbidden or allowed.

13. An information processing method implemented by a user equipment (UE), wherein the information processing method comprises:
   detecting whether a user corresponding to the UE is in a vehicle or not in the vehicle, wherein the vehicle corresponds to a vehicle-mounted device;
   sending, by the UE to a control platform in response to the detecting, request information carrying a first identifier of the UE and a second identifier of the vehicle-mounted device;
   receiving, by the UE, indication information from the control platform instructing the UE to disable a vehicle-to-pedestrian (V2P) function to forbid the UE from transmitting a V2P message or instructing the UE to enable the V2P function to allow the UE to transmit the V2P message;
   disabling or enabling the V2P function based on an indication of the indication information; and
   receiving, by the UE, second indication information from the control platform instructing the UE to disable the V2P function when the UE and the vehicle-mounted device satisfy a preset ride condition based on at least one of the following information corresponding to the preset ride condition:
      a device type corresponding to the first identifier and a device type corresponding to the second identifier;
      serving cells in which the UE and the vehicle-mounted device are respectively located when the UE and the vehicle-mounted device each access a network; or geographical locations respectively reported by the UE and the vehicle-mounted device.

14. The method according to claim 13, wherein the indication information instructs the UE to:
disable the V2P function when the request information requests the UE to disable the V2P function; and
enable the V2P function when the request information requests the UE to enable the V2P function.

15. The method according to claim 13, wherein the preset ride condition comprises that a device type of the UE is different from a device type of the vehicle-mounted device.

16. The method according to claim 13, wherein the preset ride condition comprises that the UE and the vehicle-mounted device are located in a same serving cell.

17. A control platform comprising:
a memory configured to store instructions; and
a processor coupled to the memory, wherein the instructions cause the processor to be configured to:
  obtain request information that carries a first identifier of a user equipment (UE) and a second identifier of a vehicle-mounted device;
  send indication information to the UE based on the request information,
  wherein the indication information instructs the UE to disable a vehicle-to-pedestrian (V2P) function to forbid transmission of a V2P message between the vehicle-mounted device and the UE or to enable the V2P function to allow transmission of the V2P message between the vehicle-mounted device and the UE;
  determine, based on the first identifier and the second identifier, that the UE and the vehicle-mounted device satisfy a preset ride condition;
  send, to the UE, second indication information instructing the UE to disable the V2P function; and
  store at least one of the following information corresponding to the preset ride condition:
    a device type corresponding to the first identifier and a device type corresponding to the second identifier;
    serving cells in which the UE and the vehicle-mounted device are respectively located when the UE and the vehicle-mounted device each access a network; or
    geographical locations respectively reported by the UE and the vehicle-mounted device.

18. A user equipment (UE) comprising:
a memory configured to store instructions; and
a processor coupled to the memory, wherein the instructions cause the processor to be configured to:
  detect whether a user corresponding to the UE is in a vehicle or not in the vehicle, wherein the vehicle corresponds to a vehicle-mounted device;
  send by the UE in response to the detecting, request information carrying a first identifier of the UE and a second identifier of the vehicle-mounted device to a control platform;
  receive, from the control platform, indication information instructing the UE to disable a vehicle-to-pedestrian (V2P) function to forbid the UE to transmit a V2P message or to enable the V2P function to allow the UE to transmit the V2P message;
  disable or enable the V2P function based on the indication information; and
  receive, from the control platform, second indication information instructing the UE to disable the V2P function when the UE and the vehicle-mounted device satisfy a preset ride condition based on at least one of the following information corresponding to the preset ride condition:
    a device type corresponding to the first identifier and a device type corresponding to the second identifier;
    serving cells in which the UE and the vehicle-mounted device are respectively located when the UE and the vehicle-mounted device each access a network; or
    geographical locations respectively reported by the UE and the vehicle-mounted device.

19. A computer program product comprising computer-executable instructions for storage on a non-transitory computer-readable storage medium that, when executed by a processor, cause an apparatus to:
  obtain request information that carries a first identifier of a user equipment (UE) and a second identifier of a vehicle-mounted device;
  send indication information to the UE based on the request information, wherein the indication information instructs the UE to disable a vehicle-to-pedestrian (V2P) function to forbid transmission of a V2P message between the vehicle-mounted device and the UE or to enable the V2P function to allow transmission of the V2P message between the vehicle-mounted device and the UE;
  determine, based on the first identifier and the second identifier, that the UE and the vehicle-mounted device satisfy a preset ride condition;
  send, to the UE, second indication information instructing the UE to disable the V2P function; and
  store at least one of the following information corresponding to the preset ride condition:
    a device type corresponding to the first identifier and a device type corresponding to the second identifier;
    serving cells in which the UE and the vehicle-mounted device are respectively located when the UE and the vehicle-mounted device each access a network; or
    geographical locations respectively reported by the UE and the vehicle-mounted device.

20. A computer program product comprising computer-executable instructions for storage on a non-transitory computer-readable storage medium that, when executed by a processor, cause an apparatus to:
  detect that a user of a user equipment (UE) is in a vehicle or not in the vehicle, wherein the vehicle is coupled to a vehicle-mounted device;
  send, in response to the detecting, request information carrying a first identifier of the UE and a second identifier of the vehicle-mounted device to a control platform;
  receive, from the control platform, indication information instructing the UE to disable a vehicle-to-pedestrian (V2P) function to forbid the UE from transmitting a V2P message or to enable the V2P function to allow the UE to transmit the V2P message;
  disable or enable the V2P function based on the indication information; and
  receive, from the control platform, second indication information instructing the UE to disable the V2P function when the UE and the vehicle-mounted device satisfy a preset ride condition based on at least one of the following information corresponding to the preset ride condition:

a device type corresponding to the first identifier and a device type corresponding to the second identifier;

serving cells in which the UE and the vehicle-mounted device are respectively located when the UE and the vehicle-mounted device each access a network; or geographical locations respectively reported by the UE and the vehicle-mounted device.

* * * * *